(12) United States Patent
Thrun et al.

(10) Patent No.: US 9,291,461 B2
(45) Date of Patent: Mar. 22, 2016

(54) LOCATION CORRECTION

(75) Inventors: Sebastian Thrun, Los Altos Hills, CA (US); Mohammed Waleed Kadous, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 783 days.

(21) Appl. No.: 13/417,630

(22) Filed: Mar. 12, 2012

(65) Prior Publication Data

US 2013/0238236 A1 Sep. 12, 2013

(51) Int. Cl.
*G01C 21/34* (2006.01)
*G01C 21/00* (2006.01)
*G01C 21/20* (2006.01)

(52) U.S. Cl.
CPC .................... *G01C 21/206* (2013.01)

(58) Field of Classification Search
USPC ................................. 701/418, 445
See application file for complete search history.

(56) References Cited

U.S. PATENT DOCUMENTS

| | | | |
|---|---|---|---|
| 6,587,788 B1 * | 7/2003 | Green | G01C 21/20 701/300 |
| 2002/0193942 A1 | 12/2002 | Odakura et al. | |
| 2004/0204830 A1 | 10/2004 | Esaki et al. | |
| 2006/0135183 A1 | 6/2006 | Zavada et al. | |
| 2008/0004796 A1 | 1/2008 | Schott et al. | |
| 2008/0174445 A1 * | 7/2008 | Calvarese | G01S 13/878 340/686.1 |
| 2009/0009322 A1 | 1/2009 | Ramirez et al. | |
| 2010/0121488 A1 | 5/2010 | Lee et al. | |
| 2011/0010022 A1 | 1/2011 | Beavin | |
| 2011/0274094 A1 | 11/2011 | Jovicic et al. | |
| 2013/0166193 A1 * | 6/2013 | Goldman et al. | 701/410 |

OTHER PUBLICATIONS

International Search Report and Written Opinion for Application No. PCT/US2013/029836 dated Jun. 27, 2013.
"Research and Markets: Indoor Location Positioning: Research Pipelines, Start-Ups and Predictions for 2012 Features Google, Microsoft, Samsung, Apple, RIM, Nokia, Sony Ericsson & Others", [online]. [Retrieved Jan. 17, 2012] Retrieved from the internet: <http://www.businesswire.com/news/home/20111222005806/en/Research-Markets-Indoor-Location-Positioning-Research Pipelines>, 2 pages.
Alessandro Mulloni, Daniel Wagner, and Dieter Schmalstieg, Indoor Positioning and Navigation with Camera Phones, Apr.-Jun. 2009, 10 pages.

* cited by examiner

*Primary Examiner* — Mussa A Shaawat
*Assistant Examiner* — Kyung Kim
(74) *Attorney, Agent, or Firm* — Lerner, David, Littenberg, Krumholz & Mentlik, LLP

(57) ABSTRACT

Aspects of the present disclosure relate generally to indoor localization, for example, where GPS or other localization signals are unavailable. More particularly, the estimated location, and in some examples the estimated heading, of a client device may be displayed on a display of the client device. As the device is moved through the indoor space, its location and/or orientation may be estimated based on measurements from one or more orientation devices. Typically, as the client device moves through an indoor space, the location estimation may become less and less accurate. This may be addressed by allowing the user to correct the current location and/or heading. The correction may be logged by the client device and transmitted to a server for further processing.

19 Claims, 13 Drawing Sheets

LOCATION CORRECTION

BACKGROUND

Modern smartphone devices are typically equipped with location features. These devices may use signals from GPS satellites to identify a location, determine a direction of motion, and other navigation functions. However, in locations where the GPS satellite signals are weak, for example, when these devices are indoors, GPS may not function well or at all.

Some systems provide indoor navigation by using other information, such as wireless network signals, Bluetooth signals, compass data and accelerometer data as well as existing floor plans and pre-generated databases or indices of measurements. These models may be incomplete or inefficient, and may rely on dead reckoning calculations based on information from orientation devices to fill in any gaps. Thus, these systems make a guess, albeit a well-educated one, about where the user actually is based on where the user was estimated to be a short time ago. Because the error increases with each subsequent estimation, the accuracy of these estimations increases over time. Thus, after a short time, the estimated location of the user may be fairly inaccurate.

Some navigation systems, such as Google Maps for mobile, may allow users to indicate a problem with their location determination. For example, users may report inaccurate locations or even provide an actual location.

SUMMARY

One aspect of the disclosure provides a method of displaying a current location of a client device in an indoor space. The method includes determining, by a processor, a current location of a client device in an indoor space based on a previous current location estimation and first measurements received from one or more orientation devices. A map of the indoor space and a location marker indicating the current location is displayed, on a display of the client device. Input indicating a corrected current location of the client device is received. Input indicating a current heading of the client device is also received. The method also includes determining a new current location of the client device based on updated second measurements received from the one or more orientation devices and the corrected current location and the current heading.

In one example, the display is a touch-sensitive display and receiving the user input indicating a current heading includes displaying a rotating feature on the touch-sensitive display and receiving input on the touch-sensitive display indicating rotation of the rotation feature to the current heading. In another example, the display is a touch-sensitive display and receiving the user input indicating a current heading includes displaying a compass on the touch-sensitive display and receiving input on the touch-sensitive display indicating a heading on the compass. In yet another example, the display is a touch-sensitive display and receiving the user input indicating a current heading includes receiving information indicating a finger swipe on the touch-sensitive display in a direction of the current heading with respect to the map.

In a further example, the method also includes generating a log including the corrected current location, the current heading, and the second measurements from the orientation devices. In this example, the method may also include scanning for wireless network access point information including wireless network access point identifiers and signal strengths, and wherein the generated log includes the wireless network access point information. The method may also include transmitting the log to a server computer for further processing.

The method may also include receiving user input indicating a second corrected current location of the client device; receiving user input indicating a second current heading of the client device within a predetermined period of time after the user input indicating the current heading was received; generating a second log including the second corrected current location and the second corrected current heading; and when user input indicating the second corrected current location is received within a predetermined period of time after the user input indicating the corrected current location was received, associating the second log with the log including the corrected current location, the current heading, and the second measurements from the orientation devices.

In another example, the method may also include determining a path of the client device through the indoor space based on the current location of the client device and the previous current location of the client device. In this example, after receiving the user input indicating the corrected current location, a corrected path is determined based on the corrected current location, the previous current location, and the measurements received from the one or more orientation devices. In this example, the method may also include displaying the corrected path on the display.

Another aspect of the disclosure provides a device. The device includes memory storing a location determining algorithm used by devices to estimate current locations of the devices. The device also includes a processor coupled to the memory. The processor is configured to receive, from a first client device, a log including information indicating a corrected current location and a current heading received from a user. The log also includes measurements from one or more orientation devices. The processor is also configured to update the location determination algorithm based on the log. The processor is configured to transmit the updated location determination algorithm to a second client device.

Another aspect of the disclosure provides a device for displaying a current location of a client device in an indoor space. The device includes a display for displaying information to a user and for receiving input from a user. The device also includes one or more orientation components for generating measurements about the orientation of the device. The device further includes a processor coupled to the display. The processor is configured to determine a current location of the device in an indoor space based on a previous current location estimation and first measurements received from one or more orientation components. The processor is also configured to prepare, for presentation on the display, a map of the indoor space and a location marker indicating the current location. The processor is also configured to receive user input at the display, the user input indicating a corrected current location of the device and a current heading of the device. The processor is configured to determine a new current location of the device based on updated second measurements received from the one or more orientation components and the corrected current location and the current heading.

In one example, the processor is also configured to generate a log including the corrected current location, the current heading, and the second measurements from the one or more orientation devices. In this example, the processor may also be configured to scan for wireless network access point information including wireless network access point identifiers and signal strengths, and to incorporate the wireless network access point information into the log. The processor may also be configured to transmit this log to a server computer for further processing. The processor may also be configured to determine a path of the device through the indoor space based on the current location of the device and the previous current location of the device and after receiving the user input indicating the corrected current location, determine a corrected path based on the corrected current location, the previous current location, and the measurements received from the one or more orientation devices. The processor may be configured to display the corrected path on the display. The processor may also be configured to receive user input indicating a second corrected current location of the device; receive user input indicating a second current heading of the device within a predetermined period of time after the user input indicating the current heading was received; generate a second log including the second corrected current location and the second corrected current heading; and when user input indicating the second corrected current location is received within a predetermined period of time after the user input indicating the corrected current location was received, associate the second log with the log including the corrected current location, the current heading, and the second measurements from the one or more orientation devices.

A further aspect of the disclosure provides a tangible computer-readable storage medium on which computer readable instructions of a program are stored. The instructions, when executed by a processor, cause the processor to perform a method of displaying a current location of a client device in an indoor space. The method includes determining a current location of a client device in an indoor space based on a previous current location estimation and first measurements received from one or more orientation devices; displaying, on a display of the client device, a map of the indoor space and a location marker indicating the current location; receiving user input indicating a corrected current location of the client device; receiving user input indicating a current heading of the client device; determining a new current location of the client device based on updated second measurements received from the one or more orientation devices and the corrected current location and the current heading; and generating a log including the corrected current location, the current heading, and the second measurements from the orientation devices.

In one example, the method further comprises transmitting the log to a server computer for further processing.

DETAILED DESCRIPTION

Figure 1:
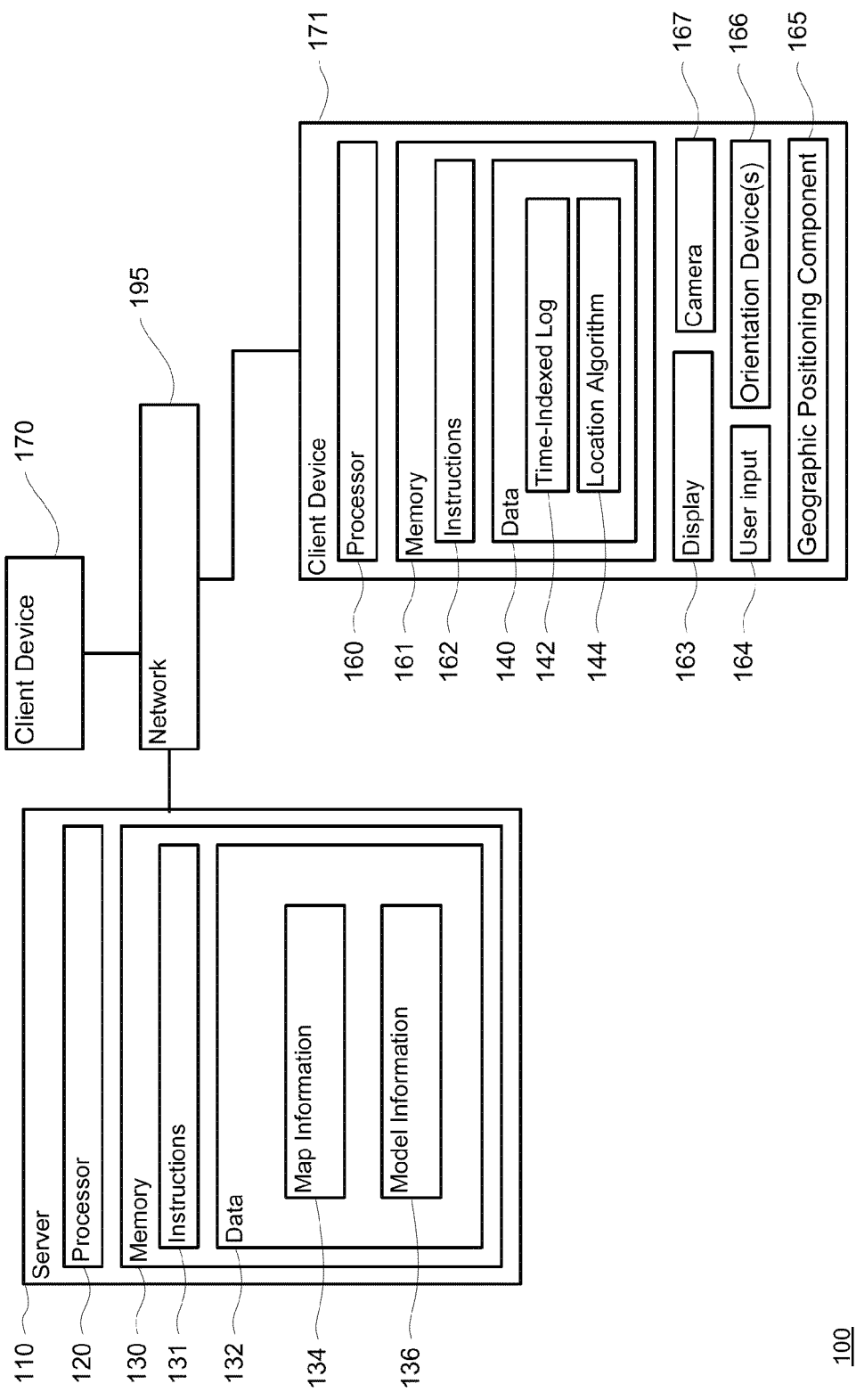
FIG. 1 is a functional diagram of a system in accordance with an exemplary embodiment.

As shown in FIG. 1, a system 100 for use with an embodiment includes a computer 110 containing a processor 120, memory 130 and other components typically present in general purpose computers.

The memory 130 stores information accessible by processor 120, including instructions 131, and data 132 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 132 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated controller such as an ASIC or other hardware-based processor. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The computer 110 may be at one node of a network 195 and capable of directly and indirectly communicating with other nodes of the network. For example, computer 110 may comprise a web server that is capable of communicating with client devices 170 and 171 via network 195 such that server 110 uses network 195 to transmit and present information to a user on display 163 of client device 171. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Figure 2:
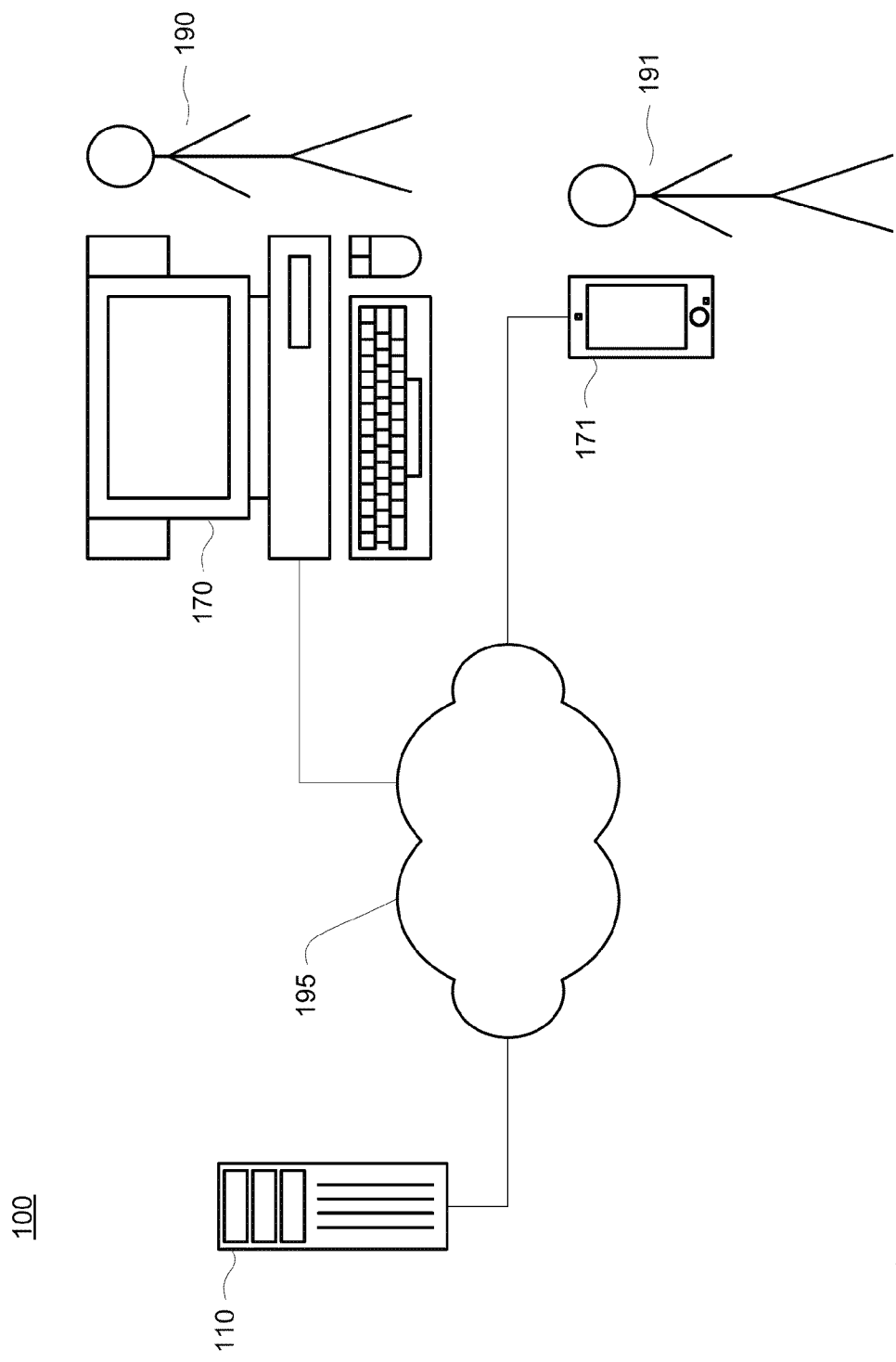
FIG. 2 is a pictorial diagram of the system of FIG. 1.

The server 110 and client computers 170 and 171 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

Each client device may be configured similarly to the server 110, with a processor, memory and instructions as described above. Each client device 170 or 171 may be a personal computer intended for use by a person 190-191, and have all of the components normally used in connection with a personal computer such as a central processing unit (CPU) 160, memory 161 (e.g., RAM and internal hard drives) storing data 140 and instructions 161, an electronic display 163 (e.g., a monitor having a screen, a touch-screen, a projector, a television, a computer printer or other device that is operable to display information), end user input 164 (e.g., a mouse, keyboard, touch-screen or microphone). The client device may also include a camera 167, speakers, a network interface device, and all of the components used for connecting these elements to one another.

Although the client devices 170 and 171 may each comprise a full-sized personal computer, they may alternatively comprise mobile devices capable of wirelessly exchanging data with a server over a network such as the Internet. By way of example only, client device 160 may be a wireless-enabled PDA, a cellular phone, a tablet PC, or a netbook capable of obtaining information via the Internet. The user may input information using a small keyboard, a keypad, or a touch screen.

Although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a single client device having a single processor, various aspects of the system and method may be implemented by a plurality of computers, for example, communicating information over network 195.

As shown in FIG. 1, the client devices may also include geographic position component 165, to determine the geographic location of the client device. For example, client device 170 may include a GPS receiver to determine the device's latitude, longitude and altitude position. Thus, as the client device changes location, for example by being physically moved, the GPS receiver may determine a new current location. The component 165 may also comprise software for determining the position of the device based on other signals received at the client device 170, such as signals received at a cell phone's antennas from one or more cell phone towers if the client device is a cell phone.

Client device 171 may also include one or more orientation devices 166, such as an accelerometer, gyroscope, compass, or any combination of these, to determine the direction in which the device is oriented. For example, an accelerometer may be used to detect the effect of gravity on the client device measured, for example, in meters per second per second. By way of example only, the client device may use input from the accelerometer to determine the client device's pitch, yaw or roll (or changes thereto) relative to the direction of gravity or a plane perpendicular thereto. In that regard, it will be understood that a client device's provision of orientation data (measurements from one or more orientation devices) as set forth herein may be provided automatically to the client device.

The orientation data received from the orientation device may be used in various ways. For example, an accelerometer or gyroscope may be used as a pedometer by running an average of the acceleration values to identify which direction is down (towards the Earth). A simple step detector may be constructed by deciding a step has been taken each time the component in the down direction is greater than an empirically-determined threshold. The distance of each step may be approximated by using an approximate stride length or speed of a person.

Figure 3A:
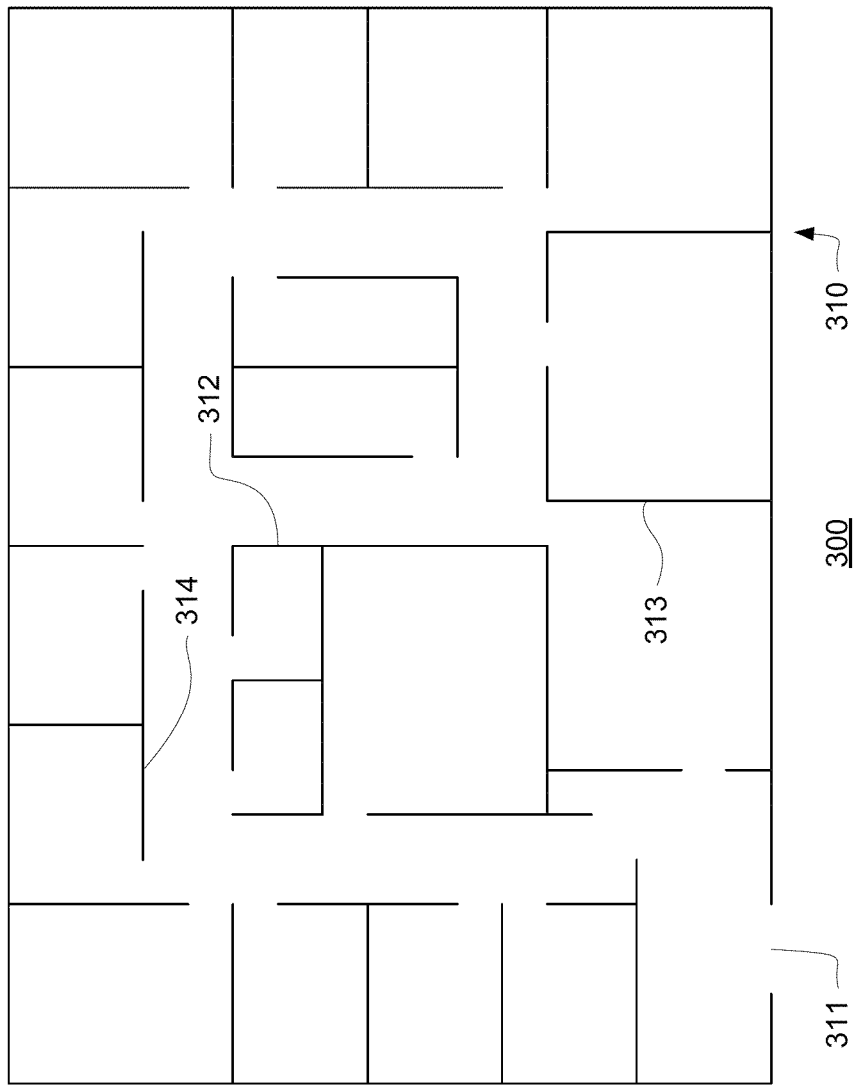
FIGS. 3A-3C are maps of an indoor space in accordance with aspects of the disclosure.
Figure 3B:
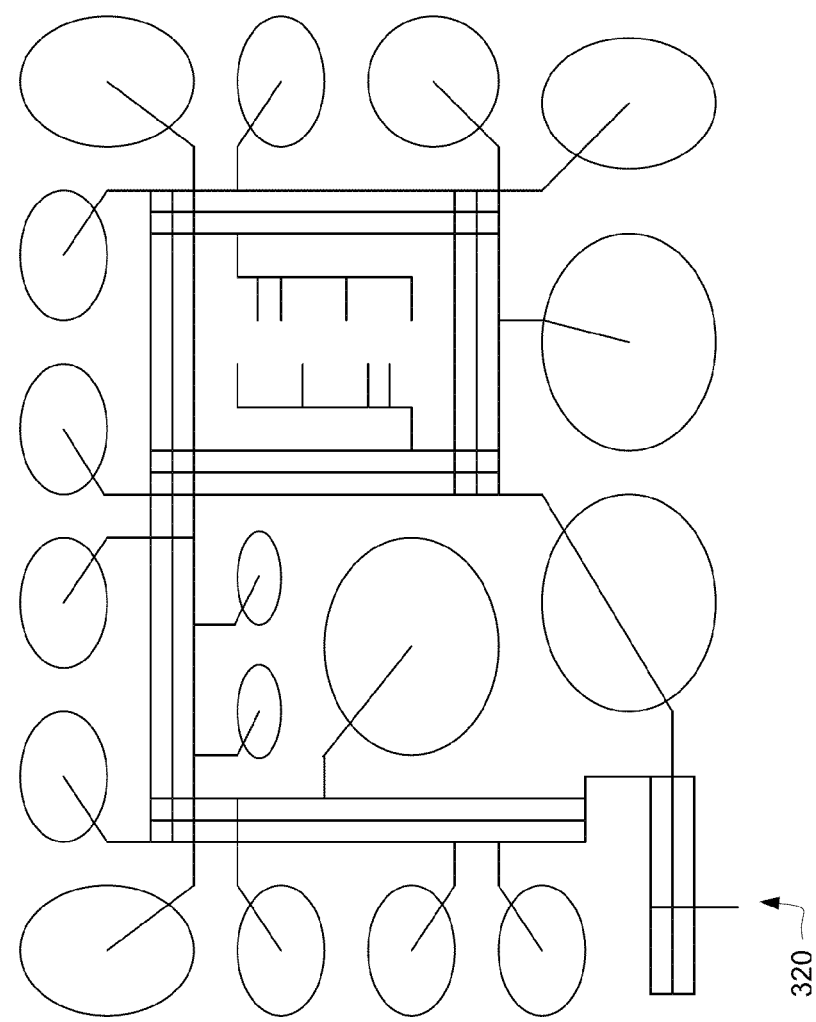
Figure 3C:
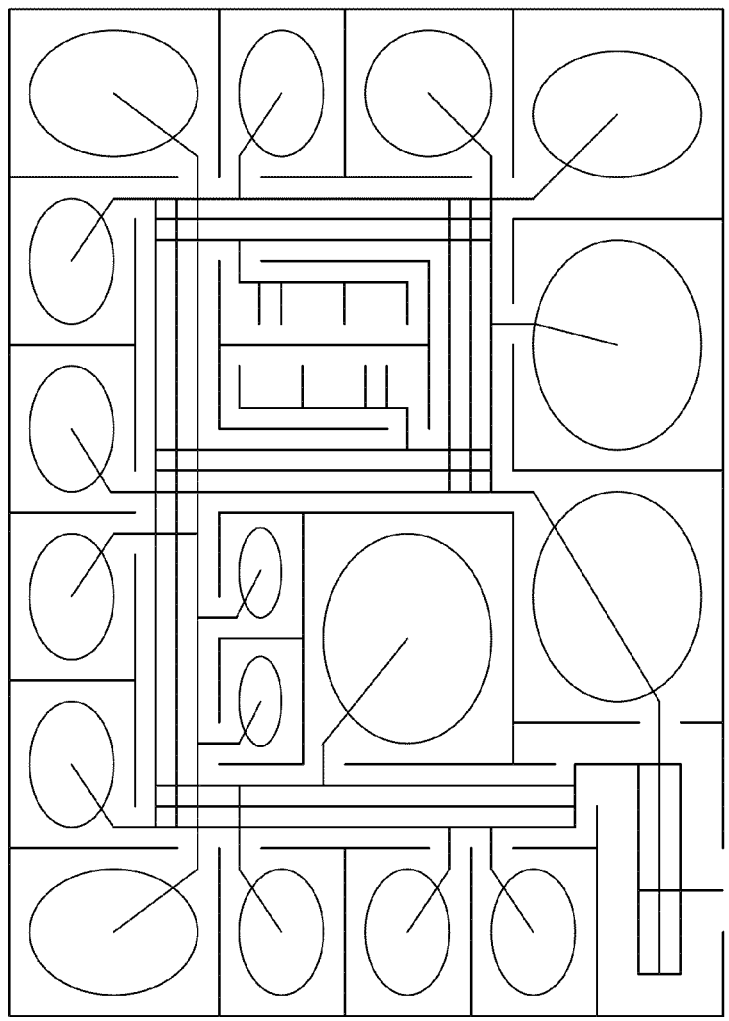

The server may access map information 134. As described in more detail below, the map information may include a series of maps representing the spaces within a building. In one example, the map information may be based upon a series of walls representing locations where a user may not walk (or is not able to walk) within a building. For example, as shown in FIG. 3A a map 310 includes an entrance 311, a plurality of walls (such as walls 312-314) defining various rooms, hallways, etc., as well as openings (such as doorways) of an indoor space. These map features may enable to users to identify various areas of the indoor space. In another example, the map information may be based upon a series of rails representing locations where a user may walk within a building. For example, FIG. 3B depicts an exemplary diagram of a rail system 320 of the same indoor space of FIG. 3A. The rails represent the locations at or near which a person is likely to walk in the indoor space. To illustrate this, FIG. 3C depicts rail system 320 on map 310. In some examples, all or a portion of map information 146 may be transmitted as needed to client devices for storage there as well. As described below, all or a portion of the map information 134 may be transmitted to the client devices as needed and stored locally at the client devices.

Data 134 of server 110 may include wireless network access point model information 136. For example, a model may include a set of locations associated with an indoor space. Each location of the set of locations may be associated with wireless network access point data describing the expected wireless network access point signals and corresponding signal strengths expected to be detected by a device scanning for such signals at different locations of the map. The model may include a simple block grid or a very refined coordinate system. The expected wireless network access point signals may be specific values or may be a range of values. Again, all or a portion of the wireless network access point model information 136 may be transmitted to the client devices as needed and stored locally at the client devices.

Figure 4:
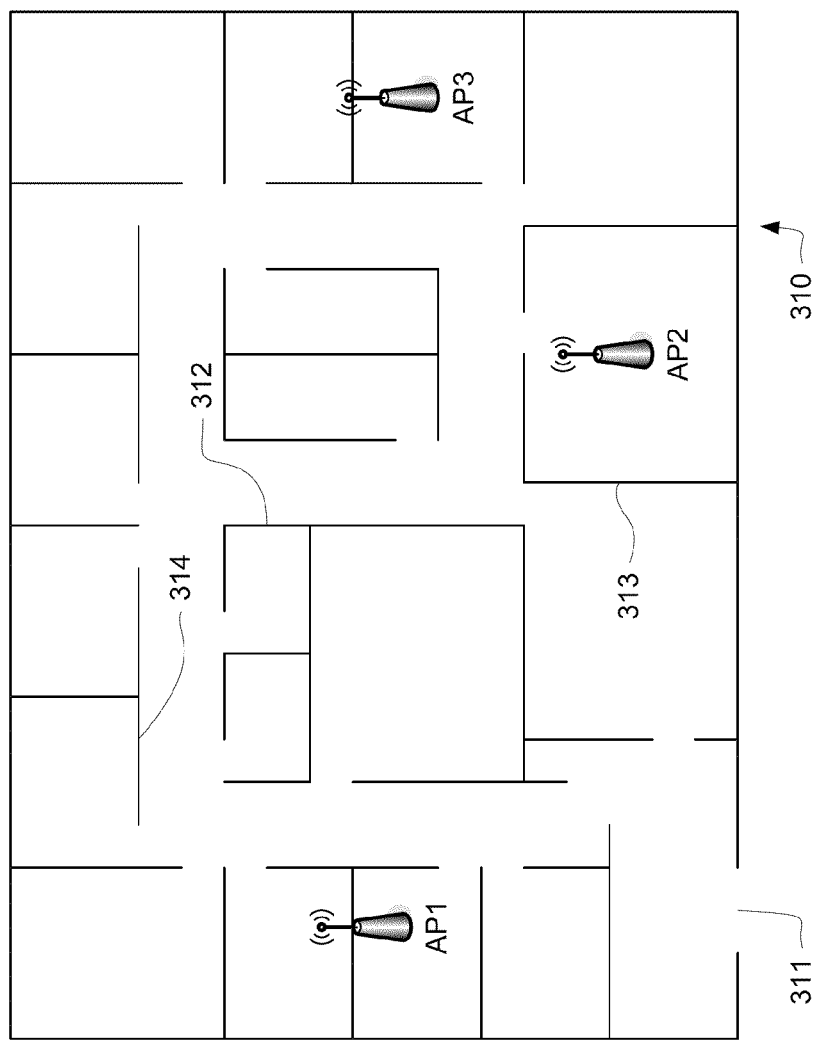
FIG. 4 is another map of an indoor space in accordance with aspects of the disclosure.

FIG. 4 depicts an example of the indoor space 300 of map 310 having 3 wireless network access points, AP1-AP3. While the example of indoor space 300 includes only 3 wireless network access points located on the same level, any number of wireless network access points may be used and may be located at different levels within the same or different indoor spaces.

The model associated with indoor space 300 may include a grid map based on map 310, wherein each box of the grid is associated with a set of wireless network access point identifiers and associated signal strengths for at least some of AP1, AP2, and/or AP3. However, various other map schemes may also be used. For example, the wireless network access point map may actually comprise a list of locations and corresponding wireless access point identifiers and signal strengths, a topographical or intensity map of wireless access point identifiers and signal strengths, etc.

Returning to FIG. 1, data 140 of client device 171 may store a time-indexed log 142 of measurements from one or more orientation devices and wireless network access point identifiers. For example, the log may include a timestamp, sensor data (for example, from a compass, accelerometer, and/or gyroscope), wireless network access point identifiers (MAC address and/or SSIDs), and signal strengths. This data need not include any payload information, but only that necessary to identify a wireless network access point (or other wireless network identifier) and its associated signal strength. Returning to the example of FIG. 4 having access points AP1, AP2 and AP3, an example log entry may be: {timestamp; AP1 and signal strength, AP2 and signal strength, and AP3 and signal strength; measurements from the one or more orientation devices}. For every unit of time in the log, the client device may record a log entry for that location. For example, a log entry may be recorded periodically, such as every 0.1 seconds. As described in more detail below, the time-indexed log may be transmitted to server 110 for processing.

Returning to FIG. 1, data 140 may also include one or more location estimation algorithms 144. These algorithms may be provided by the server and used to estimate the current location of the client device. In some examples, the client device may estimate its current location with respect to a map of the indoor space. As described above, the algorithms may be based on a combination of utilizing a wireless network access point model for the indoor space and a dead reckoning calculation. In this example, a client device may request and receive all or a portion of a wireless network access point model. The client device may then estimate its current location by scanning for wireless network access point information and calculating a location (such as an area of the map or a more finite latitude and longitude coordinate pair) with respect to the map. In another example, algorithms may utilize a particle filter model to eliminate unlikely locations. In yet another example, the algorithms may utilize the last known GPS coordinates. As the client device is moved, the client device may extrapolate is new location using use measurements from one or more orientation devices to estimate the movements of the client device relative to the previous location estimate. Although the examples described herein rely on wireless network access point models and measurements from one or more orientation devices, it will be understood that the location algorithms may also be based all or in part on other location determination calculations such as GPS signals.

In addition to the operations described below and illustrated in the figures, various operations will now be described. It should also be understood that the following operations do not have to be performed in the precise order described below. Rather, various steps may be handled in a different order or simultaneously. Steps may also be omitted unless otherwise stated.

A user may sign up or opt to participate (a "participant") in walking his or her client device through the indoor space in order to collect the time-indexed logs described above. Participants may be required to take an affirmative step in order to select or "opt-in" to participate. For example, participants may be required to sign in to a service before receiving the route or providing any information. Participants may be paid for the data provided and may also be provided with an explanation of how and why their feedback is being used. Similarly, participants may be provided with the opportunity to cease participation temporarily or permanently at any time.

After opting to participate, the participant's client device may identify an initial location for the time indexed log. In one example, a participant may actively input the initial location, for example, by selecting a point on a display or entering an address or other location identifying information. In another example, the participant may scan a bar code or capture an image of some other feature of the indoor space associated with a known location (for example, a picture of a door, sign, monument, or some other feature associated with a location in the indoor space). The barcode or geolocated feature may cause the client device to identify a location to be used as a beginning location for a time-indexed log. For example, the geolocated feature or barcode may include information for identifying a location (such as by requesting information from a server) or just an identifier to be associated with the time indexed log. In another example, the client device may begin a time-indexed log by storing the last known GPS coordinate of the client device as a beginning location for the time indexed log. The client device may also identify an initial location based a coarse wireless network access point proximity-based localization algorithm, for example, that makes use of a stored set of wireless network access point locations such as a model built from previous time indexed logs of the same area. This information (point on a map, address, GPS coordinates, code, location identifier, etc.) may be used later by a server to identify the actual initial location.

Figure 5:
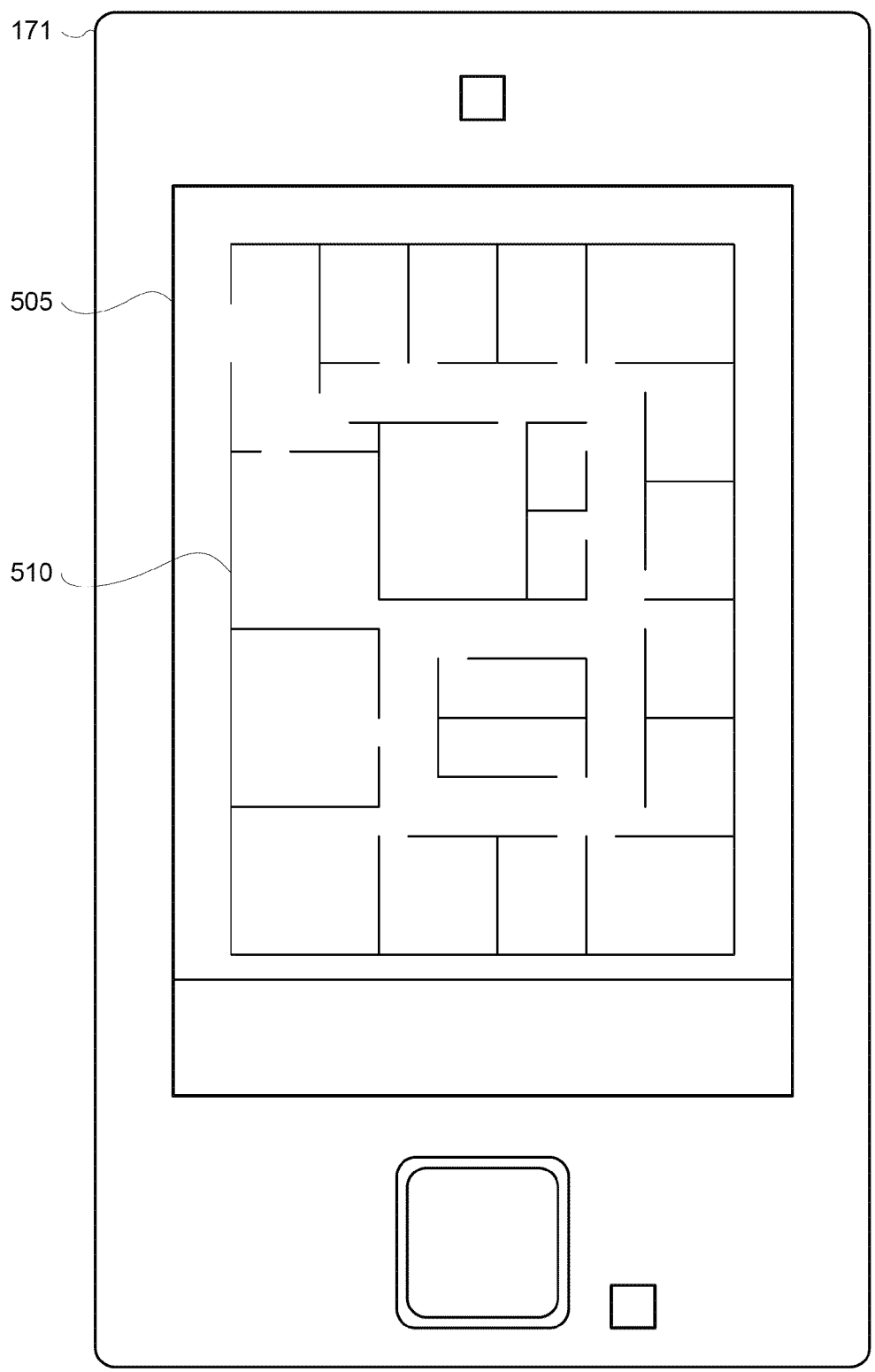
FIG. 5 is an example of a client device and screen shot in accordance with aspects of the disclosure.

In some examples, the client device may identify a relevant map of an indoor space and display it on a display of the client device. For example, a map may be provided to the client device in response to a request transmitted to the server or retrieved from local memory of the client device. The map may be requested or retrieved based on the bar codes or geolocated features described above, the last known GPS coordinates of the client device (e.g. immediately before entering a building), an address, or any other identifying information in putted by the participant. As shown in FIG. 5, client device 171 displays a map 510, corresponding to a portion of map 310, on touch-sensitive display 505. While the participant walks through the indoor space, the client device may record the time-indexed log of measurements from one or more orientation devices 166, wireless network access point identifiers, and associated signal strengths.

Figure 6:
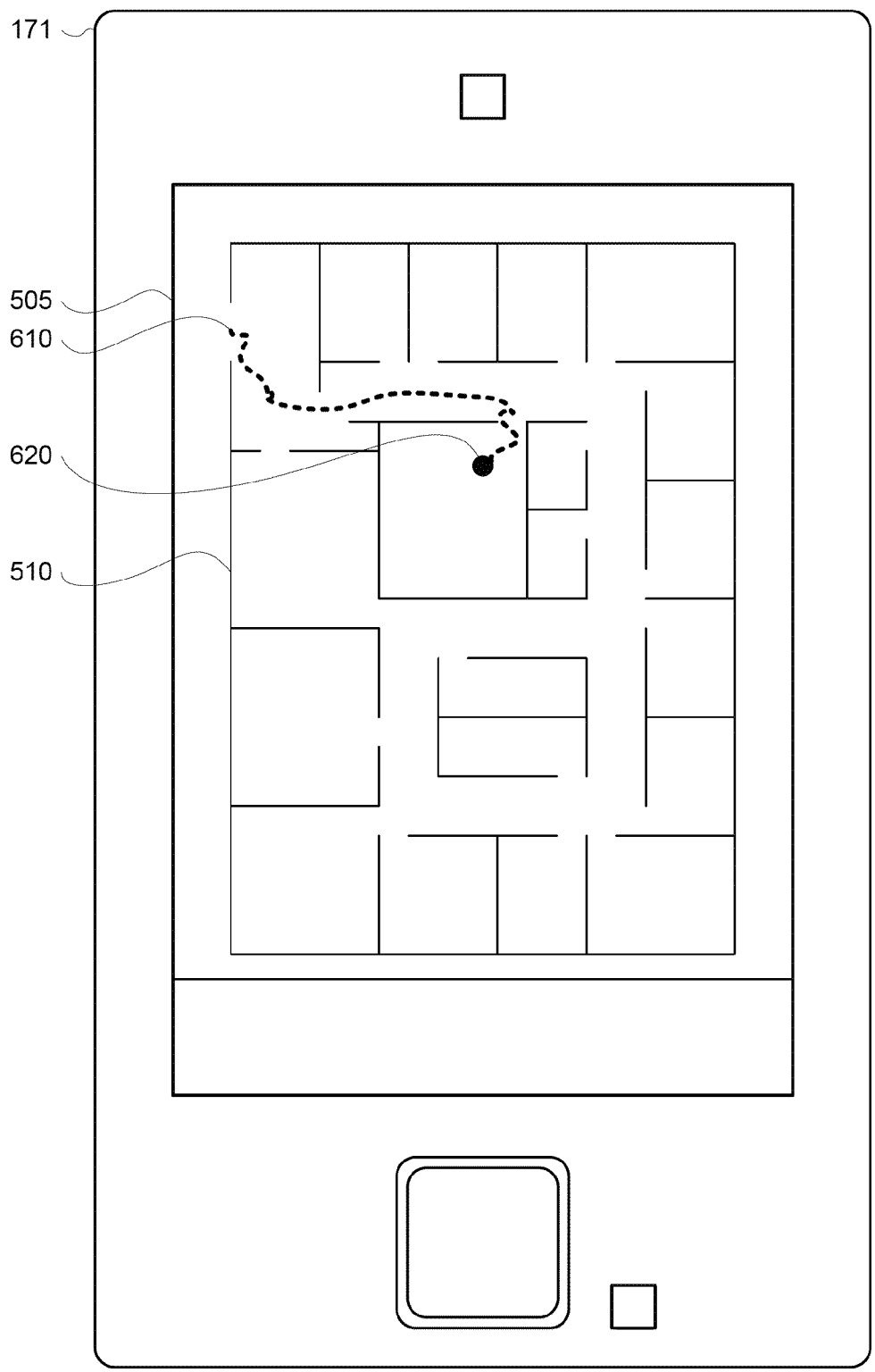
FIG. 6 is another example of a client device and screen shot in accordance with aspects of the disclosure.

The client device may then display the estimate location to the user. The location estimation may be based on the location estimation algorithms described above. The location estimations may be made periodically, for example, as often as data is recorded in the time-indexed log or even less often to reduce the amount of calculations required at the client device. As the client device is moved, the location estimations may be linked together to form a path through the indoor space. For example, as shown in FIG. 6, client device 171 displays an estimated path 610 followed by the client device to the estimated current location represented by location marker 620.

Over time, the estimation of the client device's current location may become less and less accurate. For example, the inaccuracy may be caused by imperfect sensor measurements, unreliability or changes to wireless network access points, compounded error, etc. This may make the displayed information less useful to the participant, for example, if he or she is navigating through the indoor space or simply curious about his or her location.

Figure 7B:
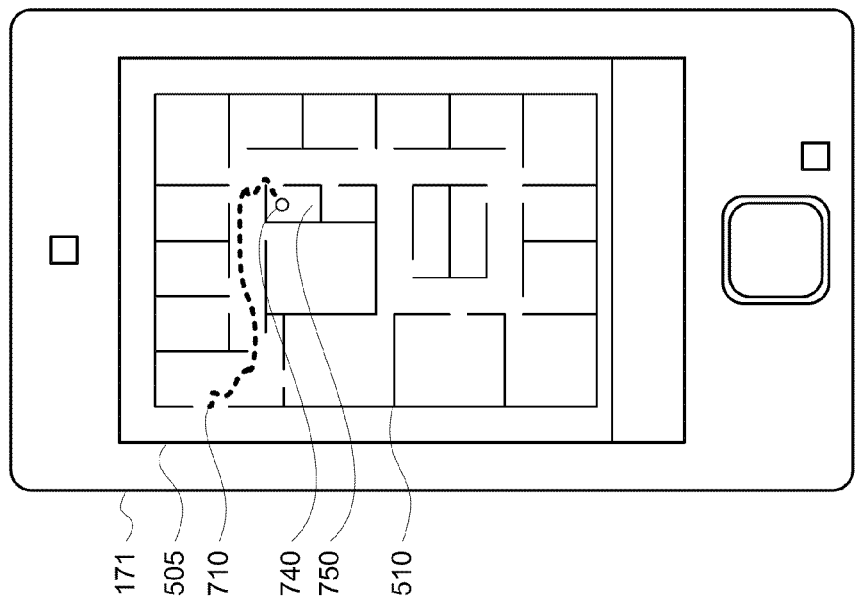
FIGS. 7A and 7B are an example client device and example screen shots in accordance with aspects of the disclosure.
Figure 7A:
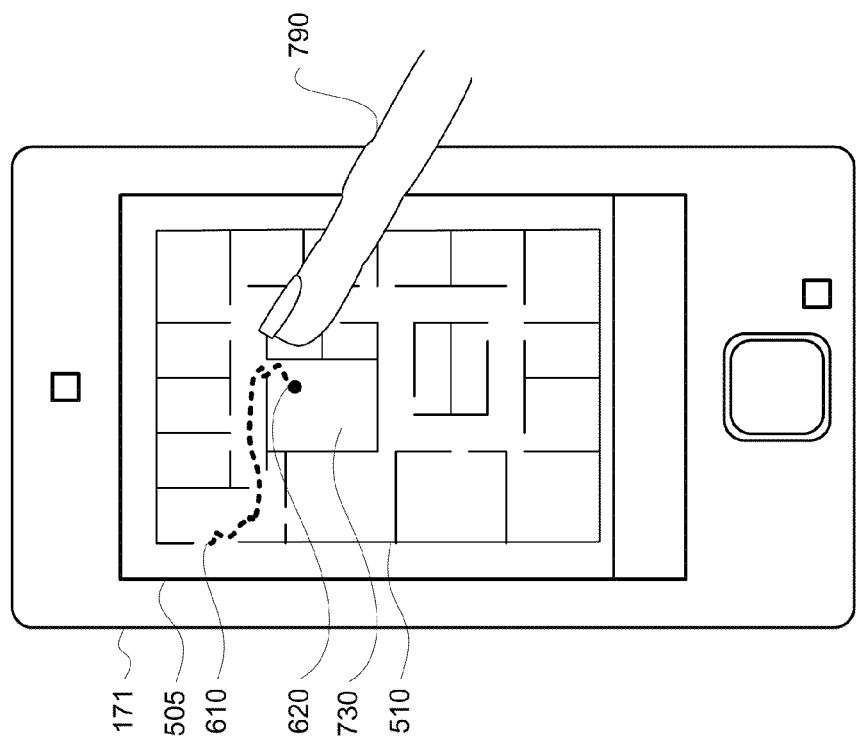

The client device may allow a user to correct the location of the client device displayed on the touch-sensitive display as shown with respect to FIGS. 7A and 7B. In one example, a participant may use his or her finger 790 to select the participant's (and the client device's) current location at location marker 620 in room 730 of map 510. The participant may user his or her finger to drag the location marker to a new location, as shown in FIG. 7B. In this example, the user has moved the location marker 620 to a new location represented by location marker 740 in room 750.

In another example, once the participant has selected the incorrect location marker (location marker 620 of the example of FIG. 7A), the client device may display a popup message or menu. The participant may then select an option to correct the location and select the new location by tapping the desired location on the display.

Once the location has been corrected, the previous location estimations, and the path between them, may also be corrected as well. The corrected location may be used as a new starting point for the particle filter and/or dead reckoning calculation. In other words, the new, corrected location may trump the previous current location estimation. For example, once the location marker has been moved as shown in FIG. 7B, path 610 is now repositioned to path 710. In other words, all of the locations along the path 610 are recalculated based on a new current location represented by location marker 740.

Figure 8B:
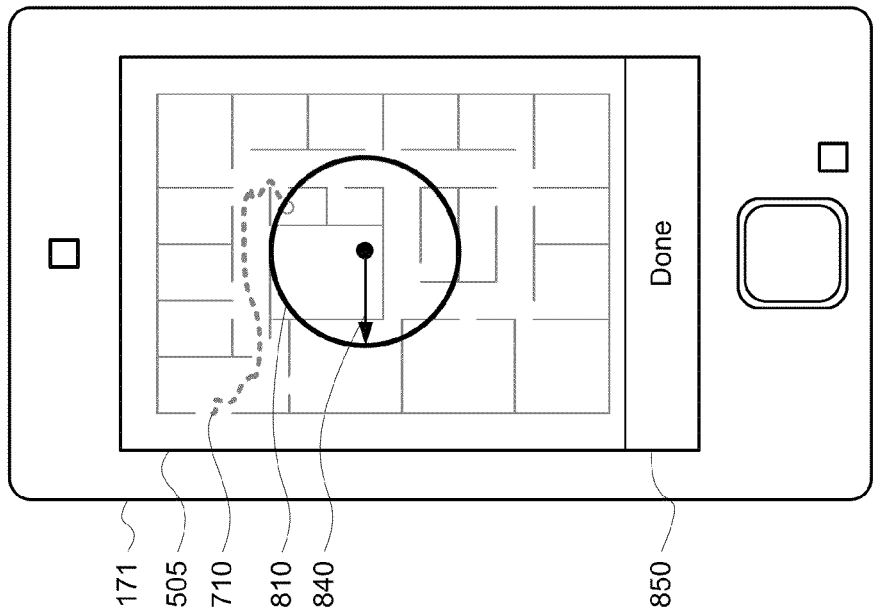
FIGS. 8A and 8B are another example client device and example screen shots in accordance with aspects of the disclosure.
Figure 8A:
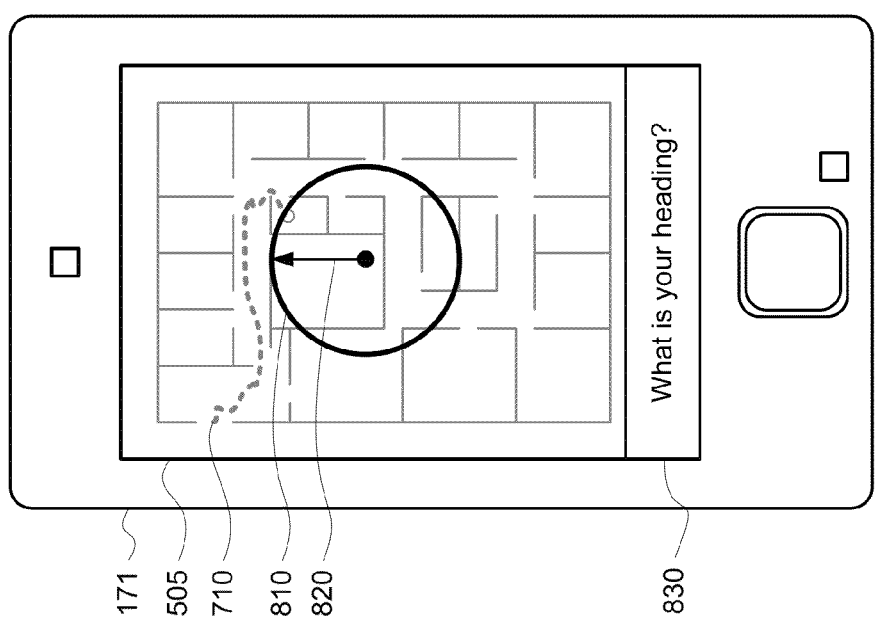

In some examples, once the location has been corrected, the participant may also indicate his or her current heading. For example, the sensor information may be used to determine an approximate heading. This information may be used in conjunction ith the layout of the indoor space in order to determine the heading of the user. As shown in FIG. 8A, once the user has selected a new current location, the client device may display a compass 810 and a request 830 that the participant indicate his or her current heading with respect to the displayed map. Compass 810 may initially be displayed with an estimated heading 820, based on measurements received from the one or more orientation devices, or simply a default heading (always initially up or down, etc.). The participant may then indicate the new heading by tapping the desired location on the compass indicating the correct heading. As shown in FIG. 8B, the participant has indicated that the new heading 840 is left relative to the displayed map. Once the participant is satisfied with the new heading, he or she may select an option, such as button 850, to confirm the new heading.

Figure 9B:
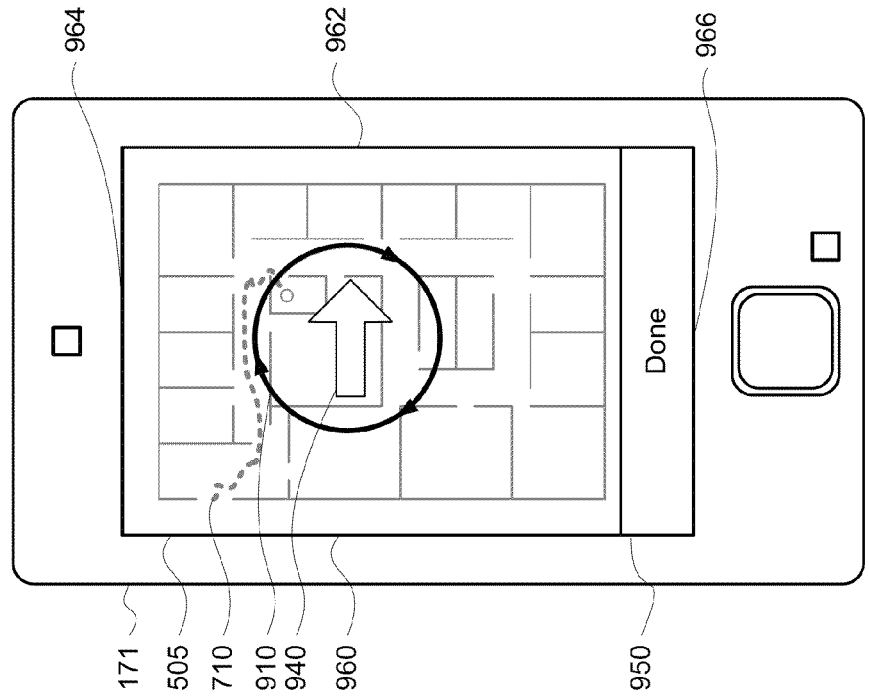
FIGS. 9A and 9B are a further example client device and example screen shots in accordance with aspects of the disclosure.
Figure 9A:
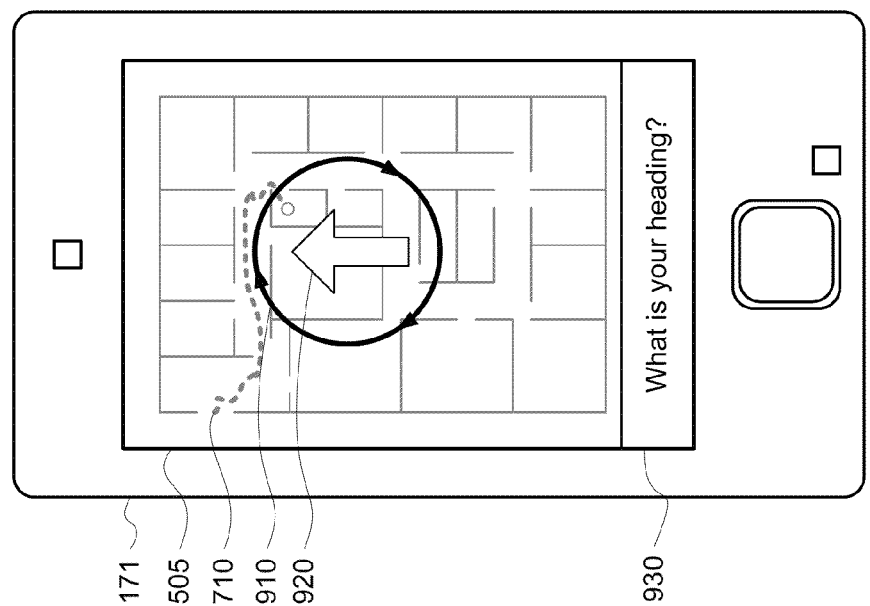

In another example, as shown in FIG. 9A, once the user has selected a new current location, the client device may display a wheel 910 and a request 930 that the participant indicate his or her current heading with respect to the displayed map. Like compass 810, wheel 910 may include an arrow 920 indicating an initial estimated heading, based on measurements received from the one or more orientation devices, or simply a default heading (always initially up or down, etc.). Rather than selecting a portion of wheel 910 (as with the example of compass 810), a participant may rotate the wheel until the arrow is moved into a desired orientation with respect to the map. As shown in FIG. 9B, the participant has indicated that the new heading indicated by the direction of arrow 940 is right relative to the displayed map. Once the participant is satisfied with the new heading, he or she may select an option, such as button 950, to confirm the new heading.

In addition to selecting a point on a compass or rotating a wheel, other methods may also be used to indicate the participant's new heading. For example, returning to the example of FIG. 9B, a user may swipe his or her finger across the touch-sensitive display of the client device in the direction of the participants heading. For example, if the user is heading towards the right side of the map, a swipe of a finger away from the left side 960 of the display and towards the right side 962 of the display may be used to indicate this heading. Similarly, if the user is heading towards the bottom of the map, a swipe of a finger away from the top side 964 of the display and towards the bottom side 966 of the display may be used to indicate this heading. The top, bottom, right and left sides will be relative to the orientation of the device, thus, the participant need only swipe relative to the displayed image of the map rather than the actual display itself. Although in the examples of FIGS. 8A, 8B, 9A, and 9B, the client device has already calculated the new path 710, this new path may be calculated after the new heading information has been input by the participant. This may allow the client device to increase the accuracy of the estimated previous locations of the client device as well as the path between these locations.

Figure 10B:
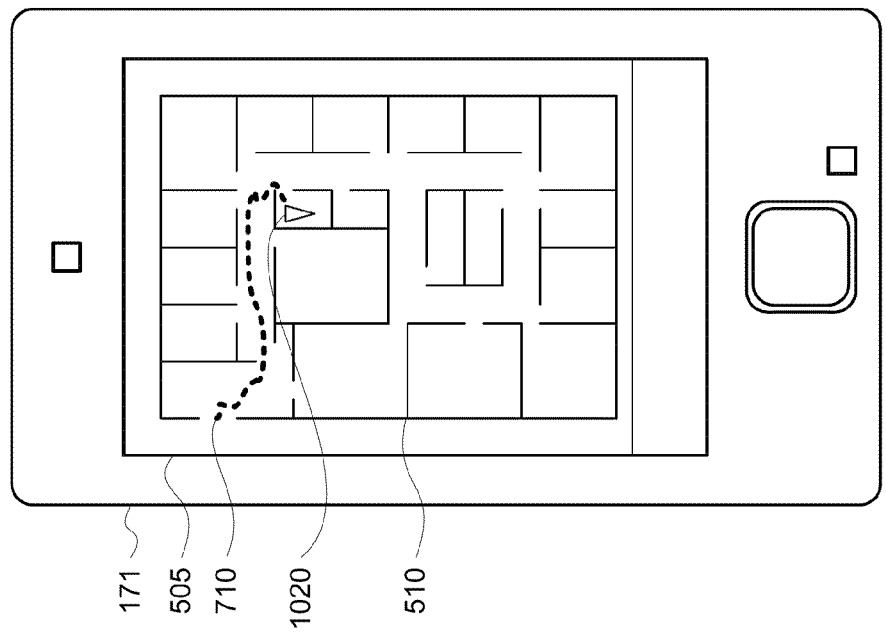
FIGS. 10A and 10B are another example client device and example screen shots in accordance with aspects of the disclosure.
Figure 10A:
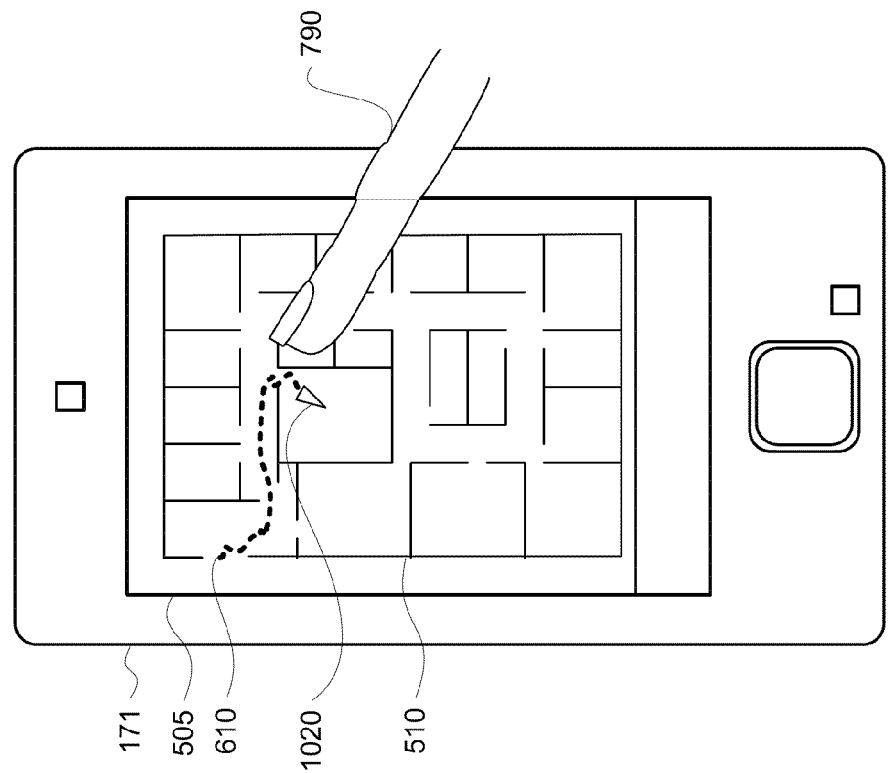

In some examples, when the user is walking through the indoor space, the client device may display not only the estimated path, but also an estimated heading. In this example, depicted in FIG. 10A, direction indicator 1020 indicates the estimated heading of the client device with respect to the map 510. Once the user has corrected the current location and heading, as shown in FIG. 10B, direction indicator 1020 depicts the new heading input by the participant.

In this example, the user may observe that the current location and/or heading are incorrect and select to correct them. Thus, as described above, the user may select the direction indicator 1020 using his or her finger 710. The client device may display a menu or an option to correct the location and heading, location only, or heading only. If the user selects to correct the location and the heading, he or she may continue to do so using, for example, any of the options described above. If the user selects to correct the location only, he or she may simply tap on the desired location or drag the direction indicator to the desired location as described above. If the user selects to correct the heading only, he or she may do so using the compass, wheel, or swipe examples described above.

After the new location, and in some examples the direction of movement, have been received by the client device, this information may be logged for later use. For example, a client device may log the new corrected location, the previous location estimation, the new corrected heading, and the sensor data. This information may be stored in the time-indexed log or at some other location.

In another example, rather than treating all corrections as independent from one another, two consecutive inputs may be linked together. For example, if the user changes the position of the location indicator and the client device subsequently displays the client device moving in an incorrect direction, the user may change the position or heading of the location indicator. As these changes are made within a short period of time, such as a few seconds or more, this information may be processed and/or logged together. By linking multiple corrections, the accuracy of the location determination may increase, and in addition, this information may be more useful when processed by the server as described below.

The time-indexed logs and the corrected location and heading information may be transmitted to a server. For example, a particular time-indexed log may be transmitted to the server periodically during the collection of the time-indexed log. In another example, the time-indexed log may be transmitted to the server when the participant affirmatively requests to do so, for example, by selecting an option to transmit or "share" the time indexed log with the server. The time-indexed log may also be transmitted automatically when a participant scans a barcode, captures an image of a feature associated with a known location as described above, or leaves the indoor space. In some examples, the time-indexed log may include an ending location input by the participant or identified by the client device (for example, by recording a GPS location once the client device has left the indoor space).

Although the correction information may be most useful to the server and later processing when it is included in or associated with a time-indexed log, the client device need not be generating the time-indexed log in order to use and benefit from the corrections to the location and/or heading estimations described above. For example, rather than logging measurements from one or more orientation devices and other information, the client device may simply display the current estimated location, and in some examples, path of the client device. This may be useful to a user who wants to determine his or her location in the indoor space or find a particular location (such as a restroom or conference room). When the user decides to correct the location and/or heading information, he or she may use any of the examples described above. As with the time-indexed log example, the correction information (new and old locations and headings) and measurements from the one or more orientation devices may be logged and transmitted to the server for further processing.

The server may process the time-index logs in order to generate or increase the accuracy of the model information for the indoor space. For example, the server may receive the time-indexed logs from a plurality of client devices. Each time-indexed log may be analyzed, for example, to identify a set of possible locations and possible headings which make up a path of the particular client device that collected the time-indexed log in the indoor space. The accuracy of the paths may be increased by incorporating the correction information into the determination of the paths. The path data may then be used to generate a wireless network access point model or to update or correct an existing model. The path data may also be used to detect errors in a model or map, for example, where one or more client devices have taken a path through an area which was not indicated to be passable in the model or map.

This data may also be used to increase the accuracy of location and/or heading estimations made at other client devices, including those which do not provide correction information and/or have all of the sensors described above. For example, a client device may send the correction information to a server. The server may use the correction information to increase the accuracy of the location estimation algorithms. This information may then be shared with other client devices in order to update the location algorithms used by these client devices. The updated location algorithms may in turn increase the accuracy of the location estimations at these other client devices.

The wireless network access point models may then be used to provide location-based services to client devices in the indoor space. For example, the models may be used to provide navigation, advertising, social networking, and other such services.

Figure 11:
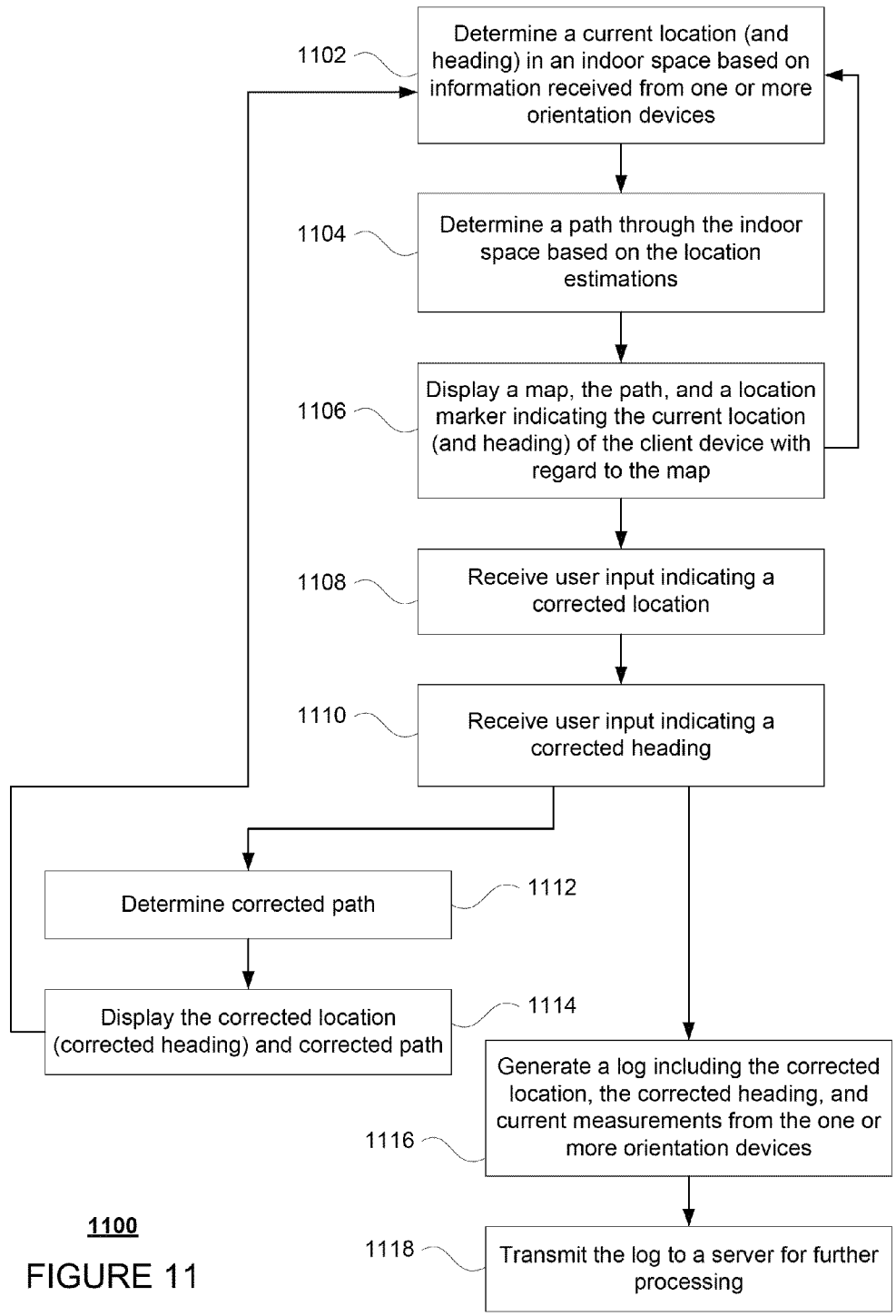
FIG. 11 is an example flow diagram in accordance with aspects of the disclosure.

Flow diagram 1100 of FIG. 11 depicts an example of some of the features described above. For example, at block 1102, the client device determines a current location, and in some examples a heading, in an indoor space. As in the examples described above, the estimation is based on information received from one or more orientation devices. The client device also determines a path through the indoor space based on the current and previous location estimations at block 1104. A map and a location marker indicating the current location of the client device relative to the map may be displayed on the display of the client device at block 1106. As noted above, the path may also be displayed.

The flow may then return to block 1102 so that a new current location is estimated, an updated path is determined at block 1104, and this information is again displayed to the user at block 1106. This is repeated until the client device receives input from the user. For example, once a user decides that the current location estimation is inaccurate, he or she may input a corrected location and heading using any of the examples described above. This user input indicating the corrected current location and headings may be received by the client device at blocks 1108 and 1110, respectively. This information may be used to determine a corrected path at block 1112. The corrected path and corrected location may be displayed at block 1114. In some examples, the client device may also display the corrected heading as well. At this point, the flow returns to block 1102, and the client device uses the corrected location and heading to determine the current location of the client device.

Returning to block 1110, once the client device has received the user input indicating the corrected location and corrected heading, the client device may also store this information. For example, at block 1116, the client device generates a log entry including the corrected location, corrected heading, and current measurements from the one or more orientation devices. This log may then be transmitted to a server for further processing as described above at block 1118.

Allowing a participant to correct the location and/or heading of the client device provides a number of benefits. For example, the present disclosure provides an intuitive and user friendly way to correct inaccurate locations and headings. In addition, by correcting the location and heading of the client device, the participant may immediately be able to receive more accurate location based services (advertisements, directions, information about the indoor space, etc.). In addition, correction data may be processed and used to increase the accuracy of models and calculations used for future location estimations.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. A method of displaying a current location of a client device in an indoor space, the method comprising:
   determining, by a processor, a current location of a client device in an indoor space based on a previous current location estimation and first measurements received from one or more orientation devices;
   displaying, on a display of the client device, a map of the indoor space and a location marker indicating the current location;
   receiving user input indicating a corrected current location of the client device;
   receiving user input indicating a current heading of the client device; and
   determining a new current location of the client device based on updated second measurements received from the one or more orientation devices and the corrected current location and the current heading.

2. The method of claim 1, wherein the display is a touch-sensitive display and receiving the user input indicating a current heading further comprises:
   displaying a rotating feature on the touch-sensitive display; and
   receiving input on the touch-sensitive display indicating rotation of the rotation feature to the current heading.

3. The method of claim 1, wherein the display is a touch-sensitive display and receiving the user input indicating a current heading further comprises:
   displaying a compass on the touch-sensitive display; and
   receiving input on the touch-sensitive display indicating a heading on the compass.

4. The method of claim 1, wherein the display is a touch-sensitive display and receiving the user input indicating a current heading further comprises receiving information indicating a finger swipe on the touch-sensitive display in a direction of the current heading with respect to the map.

5. The method of claim 1, further comprising generating a log including the corrected current location, the current heading, and the second measurements from the orientation devices.

6. The method of claim 5, further comprising scanning for wireless network access point information including wireless network access point identifiers and signal strengths, and wherein the generated log includes the wireless network access point information.

7. The method of claim 5, further comprising transmitting the log to a server computer for further processing.

8. The method of claim 5, further comprising:
   receiving user input indicating a second corrected current location of the client device;
   receiving user input indicating a second current heading of the client device within a predetermined period of time after the user input indicating the current heading was received;
   generating a second log including the second corrected current location and the second corrected current heading; and
   when user input indicating the second corrected current location is received within a predetermined period of time after the user input indicating the corrected current location was received, associating the second log with the log including the corrected current location, the current heading, and the second measurements from the orientation devices.

9. The method of claim 1, further comprising:
   determining a path of the client device through the indoor space based on the current location of the client device and the previous current location of the client device; and
   after receiving the user input indicating the corrected current location, determining a corrected path based on the corrected current location, the previous current location, and the measurements received from the one or more orientation devices.

10. The method of claim 9, further comprising displaying the corrected path on the display.

11. A device for displaying a current location of a client device in an indoor space, the device comprising:
    a display for displaying information to a user and for receiving input from a user;
    one or more orientation components for generating measurements about the orientation of the device;
    a processor coupled to the display, the processor being configured to:
       determine a current location of the device in an indoor space based on a previous current location estimation and first measurements received from one or more orientation components;
       prepare, for presentation on the display, a map of the indoor space and a location marker indicating the current location;
       receiving user input at the display, the user input indicating a corrected current location of the device and a current heading of the device; and
       determine a new current location of the device based on updated second measurements received from the one or more orientation components and the corrected current location and the current heading.

12. The device of claim 11, wherein the processor is further configured to generate a log including the corrected current location, the current heading, and the second measurements from the one or more orientation devices.

13. The device of claim 12, wherein the processor is further configured to scan for wireless network access point information including wireless network access point identifiers and signal strengths, and to incorporate the wireless network access point information into the log.

14. The device of claim 13, wherein the processor is further configured to transmit the log to a server computer for further processing.

15. The device of claim 13, wherein the processor is further configured to:
    determine a path of the device through the indoor space based on the current location of the device and the previous current location of the device; and
    after receiving the user input indicating the corrected current location, determine a corrected path based on the corrected current location, the previous current location, and the measurements received from the one or more orientation devices.

16. The device of claim 15, wherein the processor is further configured to display the corrected path on the display.

17. The device of claim 12, wherein the processor is further configured to:
    receive user input indicating a second corrected current location of the device;
    receive user input indicating a second current heading of the device within a predetermined period of time after the user input indicating the current heading was received;

generate a second log including the second corrected current location and the second corrected current heading; and when user input indicating the second corrected current location is received within a predetermined period of time after the user input indicating the corrected current location was received, associate the second log with the log including the corrected current location, the current heading, and the second measurements from the one or more orientation devices.

18. A non-transitory tangible computer-readable storage medium on which computer readable instructions of a program are stored, the instructions, when executed by a processor, cause the processor to perform a method of displaying a current location of a client device in an indoor space, the method comprising:

determining a current location of a client device in an indoor space based on a previous current location estimation and first measurements received from one or more orientation devices;

displaying, on a display of the client device, a map of the indoor space and a location marker indicating the current location;

receiving user input indicating a corrected current location of the client device;

receiving user input indicating a current heading of the client device; and determining a new current location of the client device based on updated second measurements received from the one or more orientation devices and the corrected current location and the current heading; and generating a log including the corrected current location, the current heading, and the second measurements from the orientation devices.

19. The medium of claim 18, wherein the method further comprises transmitting the log to a server computer for further processing.

* * * * *

UNITED STATES PATENT AND TRADEMARK OFFICE
CERTIFICATE OF CORRECTION

PATENT NO.         : 9,291,461 B2                                        Page 1 of 1
APPLICATION NO.    : 13/417630
DATED              : March 22, 2016
INVENTOR(S)        : Sebastian Thrun and Mohammed Waleed Kadous It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this
Twenty-eighth Day of June, 2016

Michelle K. Lee
*Director of the United States Patent and Trademark Office*